United States Patent
Kothiyal et al.

(10) Patent No.: US 12,224,998 B2
(45) Date of Patent: Feb. 11, 2025

(54) SELECTION OF GATEWAYS FOR RECONNECTION UPON DETECTION OF REACHABILITY ISSUES WITH BACKEND RESOURCES

(71) Applicant: Citrix Systems, Inc., Fort Lauderdale, FL (US)

(72) Inventors: Vinay Kumar Kothiyal, San Jose, CA (US); Kevin Brock, Santa Clara, CA (US); Manoj Kumar Andol, San Jose, CA (US)

( * ) Notice: Subject to any disclaimer, the term of this patent is extended or adjusted under 35 U.S.C. 154(b) by 623 days.

(21) Appl. No.: 17/488,663

(22) Filed: Sep. 29, 2021

(65) Prior Publication Data
US 2023/0097099 A1  Mar. 30, 2023

(51) Int. Cl.
*H04L 9/40* (2022.01)
*H04L 67/01* (2022.01)
*H04L 67/1008* (2022.01)

(52) U.S. Cl.
CPC ........ *H04L 63/0823* (2013.01); *H04L 63/083* (2013.01); *H04L 63/0876* (2013.01); *H04L 67/01* (2022.05); *H04L 67/1008* (2013.01)

(58) Field of Classification Search
CPC . H04L 63/0823; H04L 63/83; H04L 83/0876; H04L 67/01; H04L 67/1008
See application file for complete search history.

(56) References Cited

U.S. PATENT DOCUMENTS

| 2010/0011126 | A1* | 1/2010 | Hsu | H04L 67/1008 709/249 |
| 2011/0090842 | A1* | 4/2011 | Hirano | H04L 63/12 370/328 |
| 2017/0085651 | A1* | 3/2017 | Harrison | G06F 21/316 |
| 2020/0076801 | A1* | 3/2020 | Funane | H04L 41/28 |
| 2020/0252389 | A1* | 8/2020 | Cao | H04L 9/3213 |

\* cited by examiner

*Primary Examiner* — Chau Le

(57) ABSTRACT

Described embodiments provide system and methods for selecting a device via which a client is to connect with a server. A client may identify a server and a plurality of devices intermediary to the client and the server via one of which the client is authenticated to connect to access the server using a certificate. The client may detect that the server is unreachable from the client authenticated to use a first connection via a first device of the plurality of devices using the certificate. The client may select, responsive to detecting that the server is unreachable, a second device of the plurality of devices via which the client is to access the server. The client may authenticate, using the certificate used to authenticate with the first device, the client to establish a second connection with the second device to access the server.

20 Claims, 13 Drawing Sheets

SELECTION OF GATEWAYS FOR RECONNECTION UPON DETECTION OF REACHABILITY ISSUES WITH BACKEND RESOURCES

FIELD OF THE DISCLOSURE

The present application generally relates to network communications. In particular, the present application relates to systems and methods for selecting a gateway via which a client is to connect with a server.

BACKGROUND

A client may access a resource hosted on a server through an intermediary gateway. When the server is down or otherwise non-operational, the client may be unable to access the resource on the server, thereby hampering various functionalities on the client.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

In a networked environment, a set of gateways (also herein referred to as proxies or intermediary devices) may reside between clients and servers, and may handle various communications between the clients and the servers. When a client is attempting to access resources hosted on one of the servers on the backend, the client may send a request to a server through a gateway that supports the communication between the two network nodes. In certain circumstances, the server may be inaccessible or unreachable from the client through the gateway, due to various issues with the server. For example, the server may become non-operational or the session established between the gateway and the server may become faulty. As a result, the access by the client to the resources hosted on the server may be interrupted, leading to loss of functionality on the client and frustrating the user experience with regard to any applications accessed via the client.

One approach to counter this problem may include having the server report any operation related issues to the gateway upon detection. Another approach may include configuring the gateway to determine the operational statuses of each server, for example, by periodically pinging the server for the status using heartbeat messages. These solutions, however, may not fully address such challenges related to the inaccessibility of the server, and may also introduce a whole myriad of other problems. For one, this setup would entail additional configuration of the gateway and server to send and receive status updates, leading to further complexity to the overall system and network architecture. For another, since clients may not rely on all the resources hosted across the multitude of servers, the reporting and pinging between the gateway and the server for status updates may lead to a waste of network resources. Moreover, such approaches may not fully account for the inability of the client to access the resources hosted on the server without any interruptions.

To address these and other technical challenges, a client may be provided with a profile for configuration of the connection with a network (e.g., a virtual private network (VPN) or software defined wide area network (SD-WAN)). The profile may identify a list of backend services (e.g., servers) the client should be able to access with. The profile may also specify a primary gateway and a list of alternate gateways (e.g., a VPN or SD-WAN gateway) through which the client is to connect while accessing the backend resources. The profile may be provided to the client by a network administrator, before connecting with any of the gateways in the network. The profile may also be provided as part of an establishment of a connection with the primary gateway. In either case, none of the alternate gateways or backend services may have awareness of the profile provided to the client or the list of backend resources or gateways.

Prior to or injunction with an establishment of a connection with any of the gateways, the client may be prompted by an authentication agent (e.g., a mobile device management (MDM) server or another system management agent) for a user of the client to enter authentication credentials to access the network. The communication with the authentication agent may be out-of-band relative to any connection with any of the gateways in the network. Upon validation of the authentication credentials, the client may receive an authentication certificate issued by the authentication agent of the network. The authentication certificate may permit the client to continue to access the backend services through the primary and other gateways of the network. Upon successful authentication, the client may use the certificate to establish a connection with the primary gateway using the certificate received from the authentication agent.

Once the establishment of the connection with the primary gateway is successful, the client may carry out monitoring of the backend resources identified in the profile for reachability through the gateway. For example, the client may periodically send out a status check message to the primary gateway to be forwarded onto each backend service, and may wait for a response from the backend service via the primary gateway. If the backend services respond, the client may continue to use the primary gateway to access the resources hosted on the backend services. Otherwise, if a number of backend services do not send any response after some number of attempts, the client may determine that those backend services may be unreachable via the primary gateway.

When unable to reach or access the backend services, the client may identify an alternate gateway specified in the list of alternate gateways of the profile, and initiate a failover process from the primary gateway to the alternate gateway. As part of the failover process, the client may use at least a portion of the session information with the primary gateway in initiating establishment of the connection with the alternate gateway. The client may also re-use the authentication certificate from the initial connection in the new connection with the alternate gateway to avoid prompting the user of the client to re-enter authentication credentials. Once the connection is established, the client may repeat the monitoring of the backend resources for reachability and the failover to other alternate gateways.

In this manner, by providing profile for configuration, the client by itself may be able to check the reachability of backend services via the gateway for the connection, without reliance on the gateway to perform the resource monitoring. As a result, the overhead and additional complexity associated with resource monitoring on the gateway and the backend services may be reduced or eliminated, thereby saving computing and network resources. Limiting the number of backend services to those to be used by the client may further lower the consumption of computing and network resources. Furthermore, with the ability to re-use authentication certificates across different gateways in the gateway, the end user of the client may be able to access the resources hosted on the backend server without repeatedly entering credentials. The avoidance of repeatedly entering authentication credentials may improve the quality of human-computer interaction (HCI) between the user and the client in accessing the backend services through the gateways in the network.

Aspect of the present disclosure are directed to methods, systems, and non-transitory computer readable media for selecting a gateway via which a client is to connect with a server. A client may identify a server and a plurality of devices intermediary to the client and the server via one of which the client is authenticated to connect to access the server using a certificate. The client may detect that the server is unreachable from the client authenticated to use a first connection via a first device of the plurality of devices using the certificate. The client may select, responsive to detecting that the server is unreachable, a second device of the plurality of devices via which the client is to access the server. The client may authenticate, using the certificate used to authenticate with the first device, the client to establish a second connection with the second device to access the server.

In some embodiments, the client may receive, for establishing the first connection with the first device, the certificate to authenticate the client to connect with a network for secure communications. In some embodiments, the client may receive a profile associated with the certificate for the client. The profile may identify a plurality of servers which the client is to access via the plurality of devices.

In some embodiments, the client may detect that the server is unreachable by monitoring for at least one response from the server to a message transmitted by at least one of the client or the first device. In some embodiments, the client may detect that the server is unreachable by receiving, from the first device, an indication that the first device is unable to connect with the server.

In some embodiments, the client may select the second device from the plurality of device in accordance with a profile. The profile may identify a sequence for selection of the plurality of devices. In some embodiments, the client may select the second device from the plurality of devices based at least on a network load of at least one of the plurality of devices.

In some embodiments, the client may establish the second connection by re-using the certificate used to authenticate the client in the first connection to authenticate the client for the second connection, without providing a prompt to a user of the client to enter authentication credentials. In some embodiments, the client may provide a prompt to a user of the client to enter authentication credentials for establishing the second connection.

In some embodiments, the client may determine that the server is unreachable from the client via none of the plurality of devices. In some embodiments, the client may provide an indication that the server is unreachable via none of the plurality of devices.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 7:
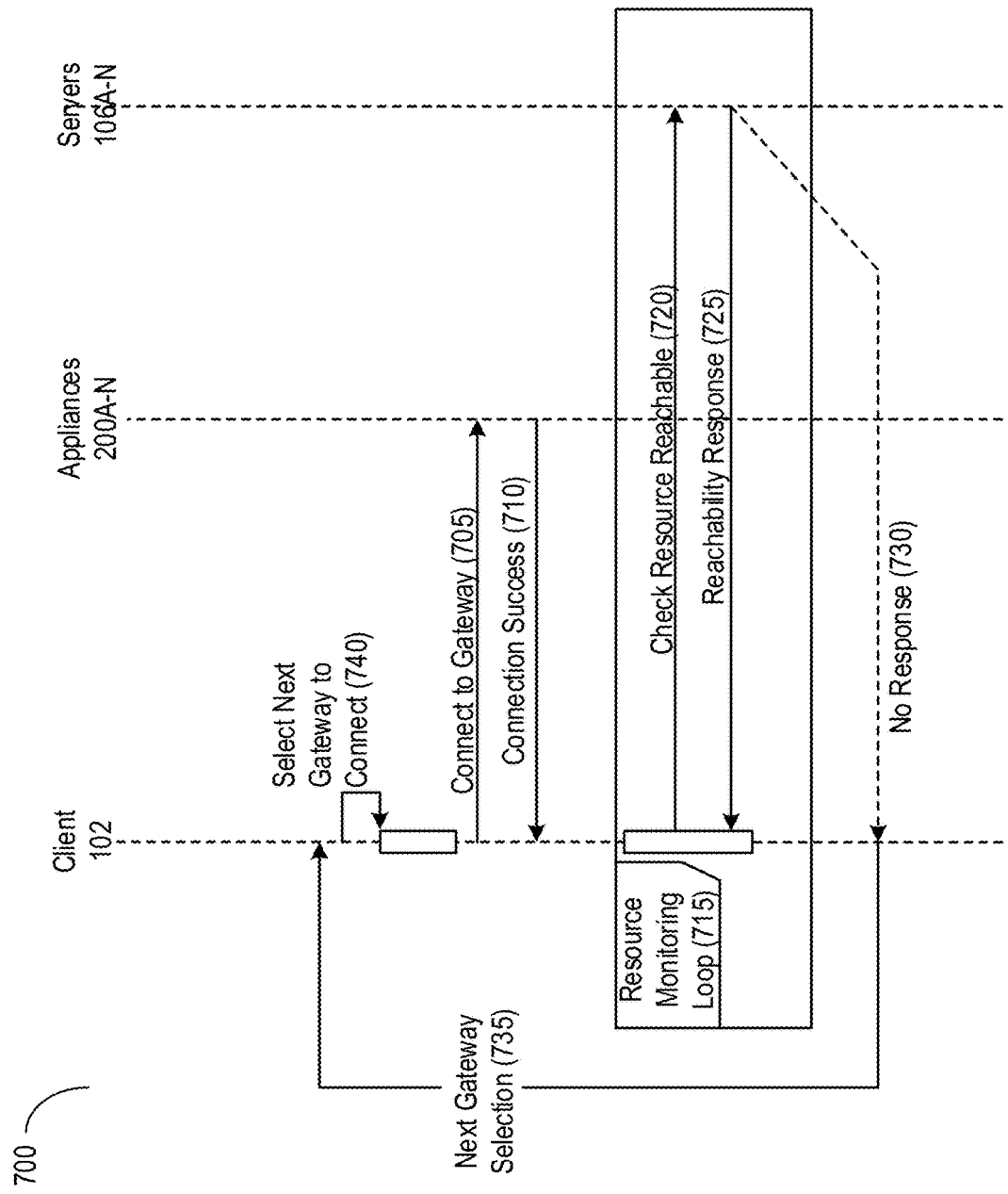
Figure 8:
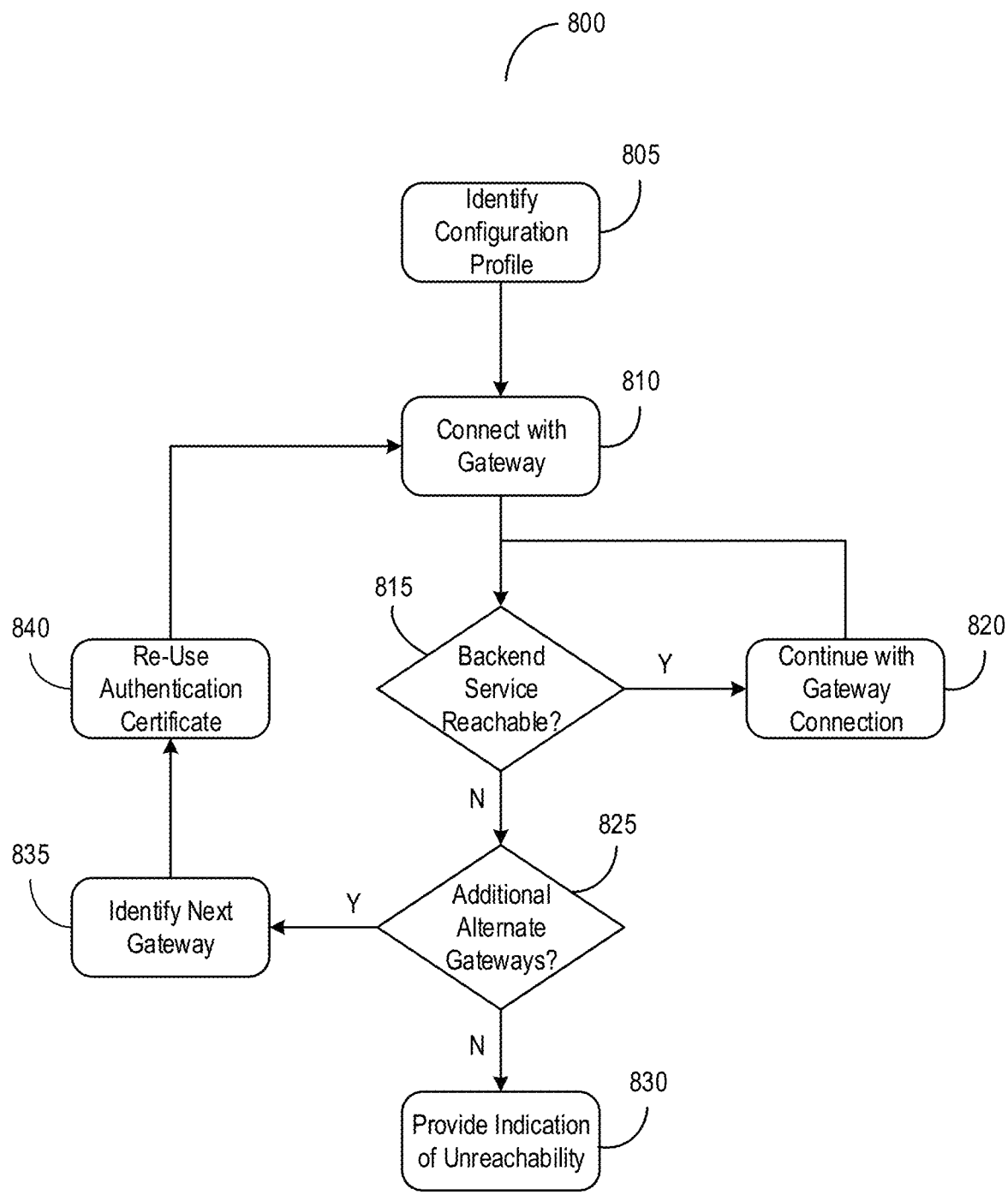

FIG. 7 is a function band diagram of an embodiment of a method of selecting gateways for reconnection upon detection of reachability issues on backend resources in accordance with an illustrative embodiment; and FIG. 8 is a flow diagram of an embodiment of a method of selecting gateways for reconnection upon detection of reachability issues on backend resources in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for selecting gateways for reconnection upon detection of reachability issues on backend resources.

A. Network and Computing Environment

Figure 1A:
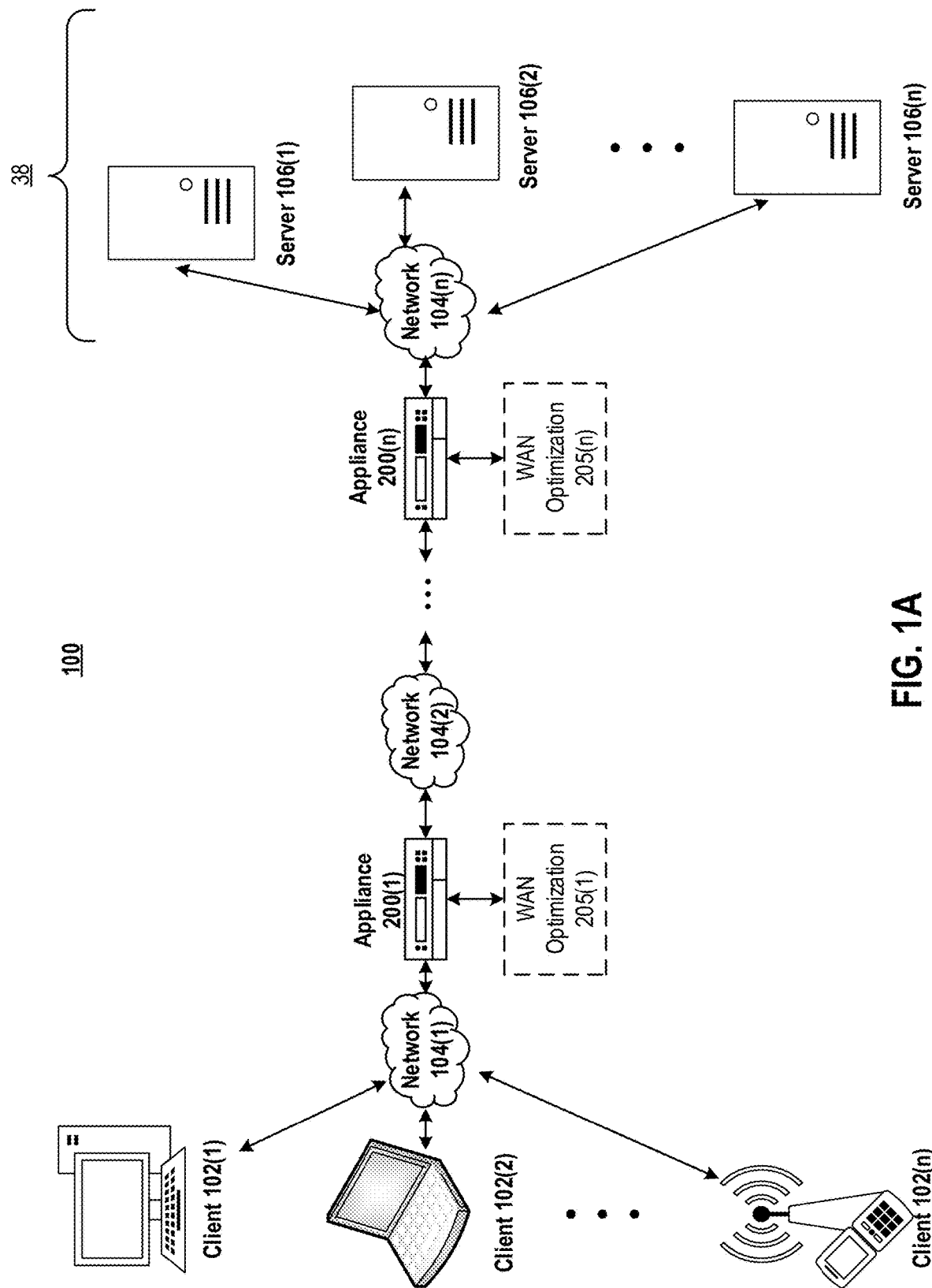
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, FL.

Figure 1B:
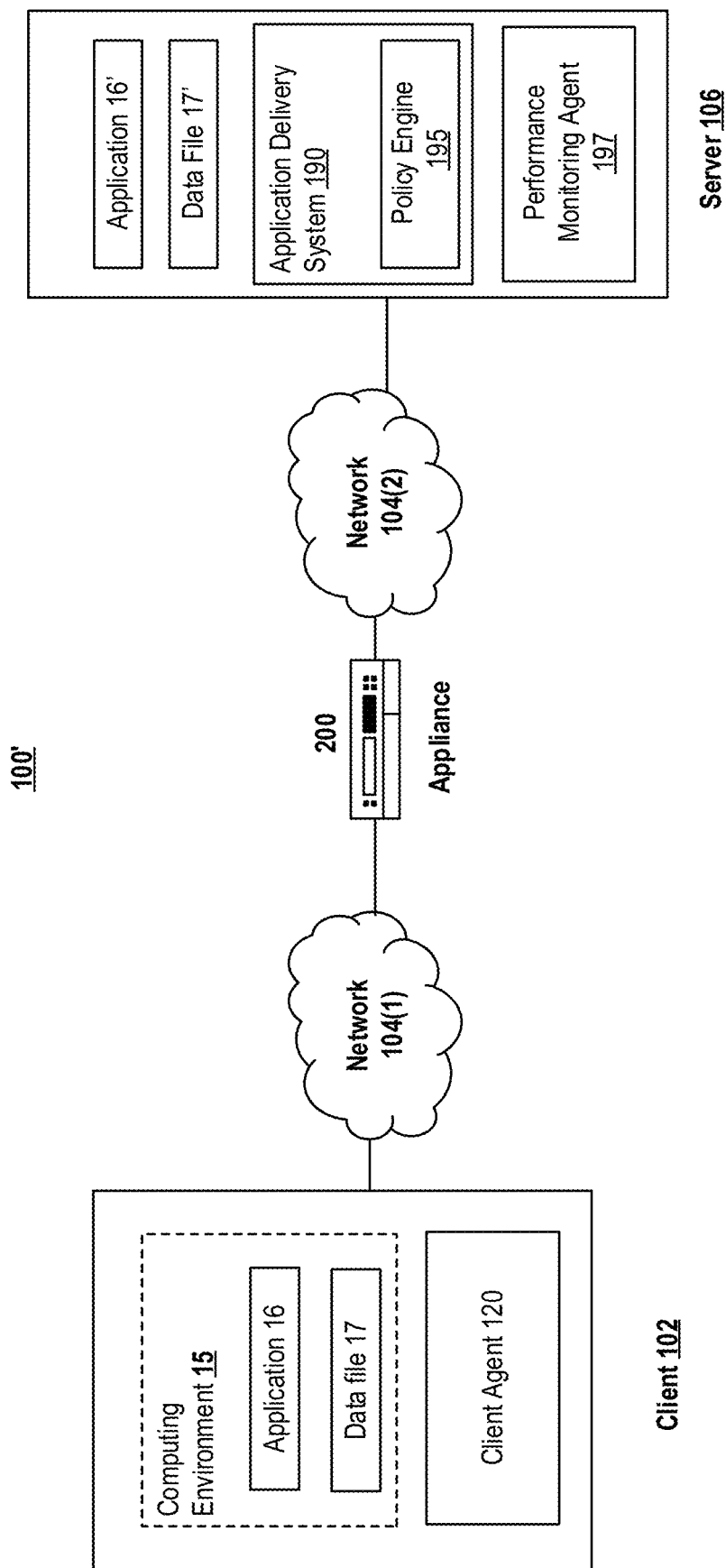
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
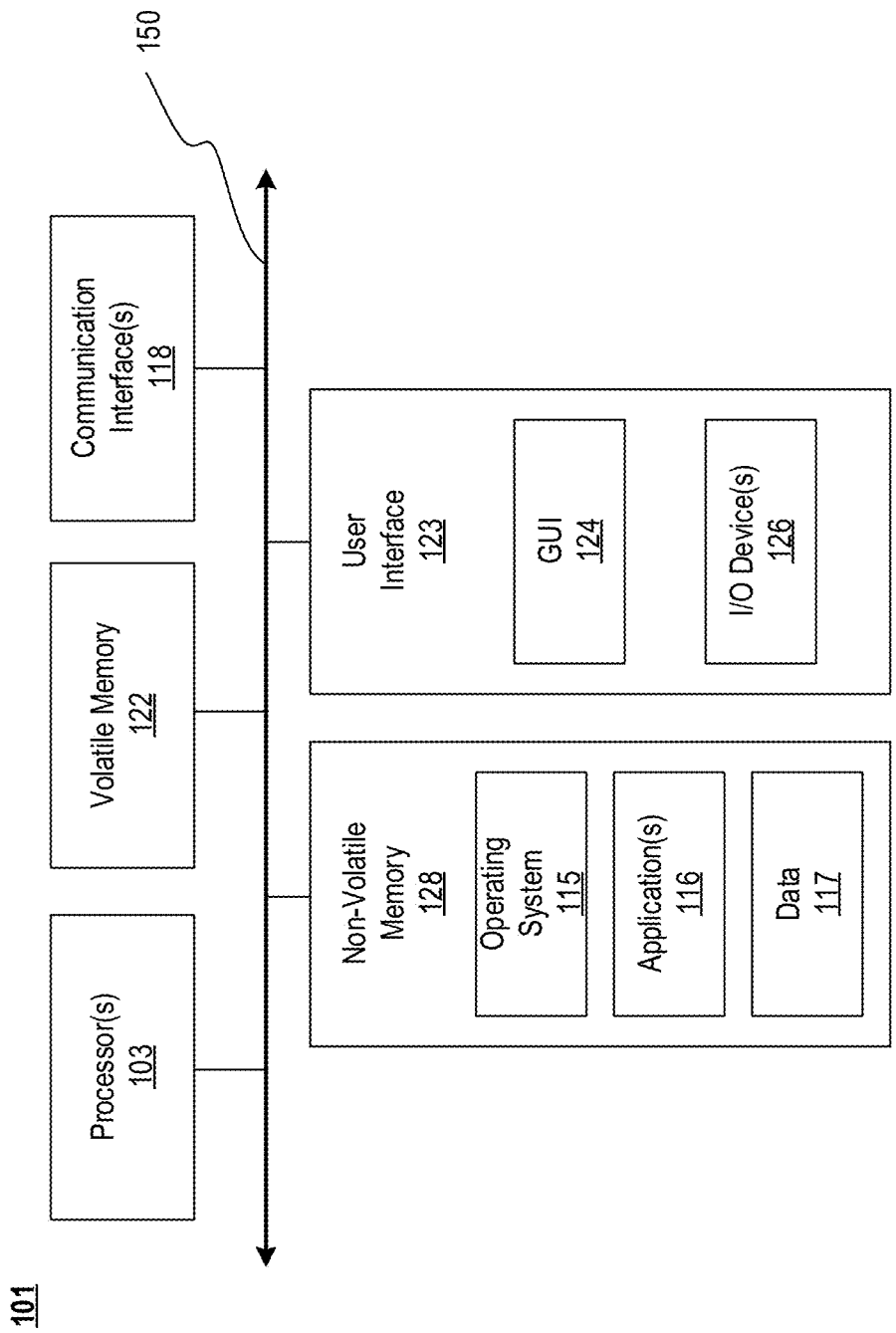
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
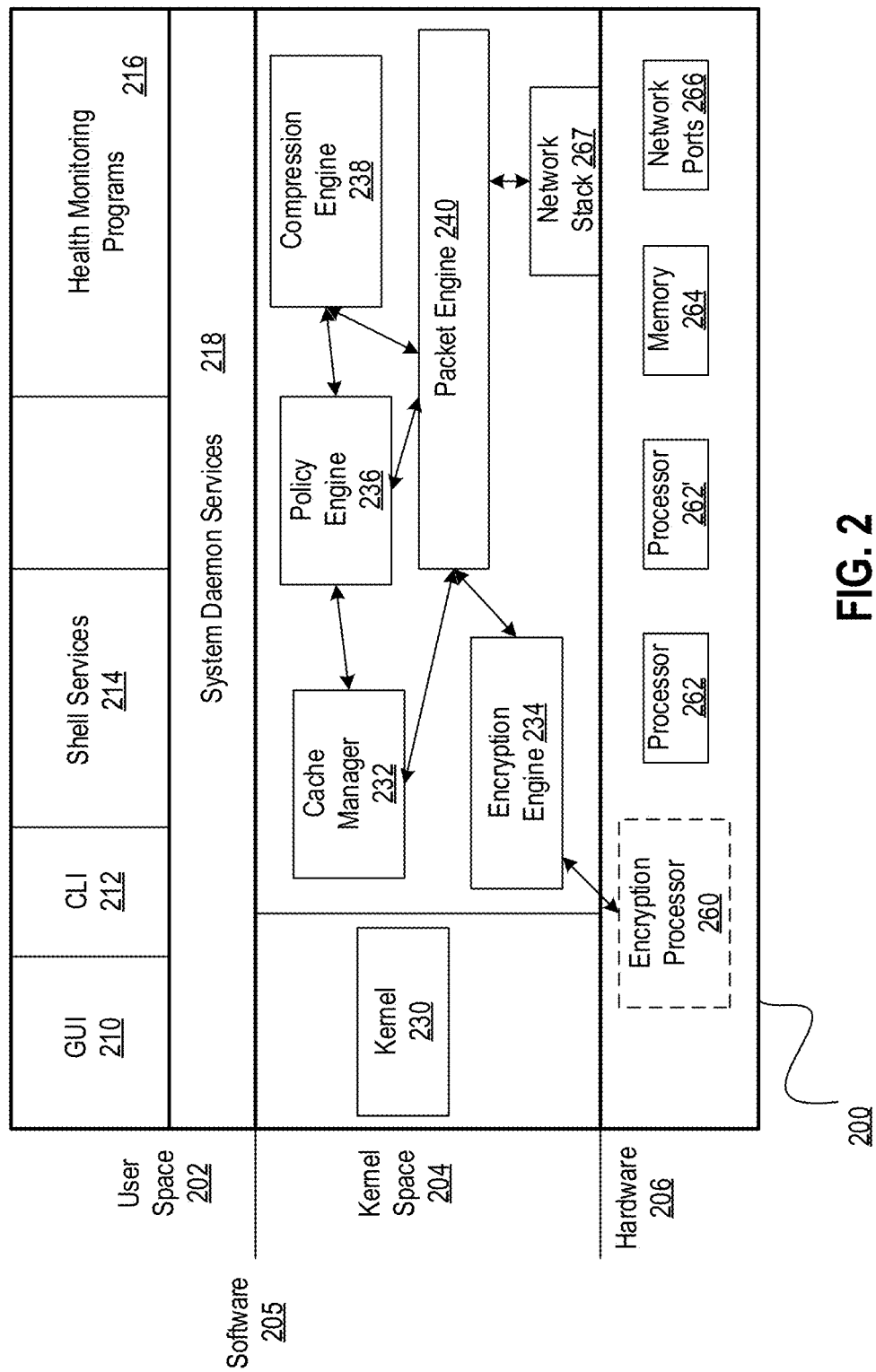
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, FL.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
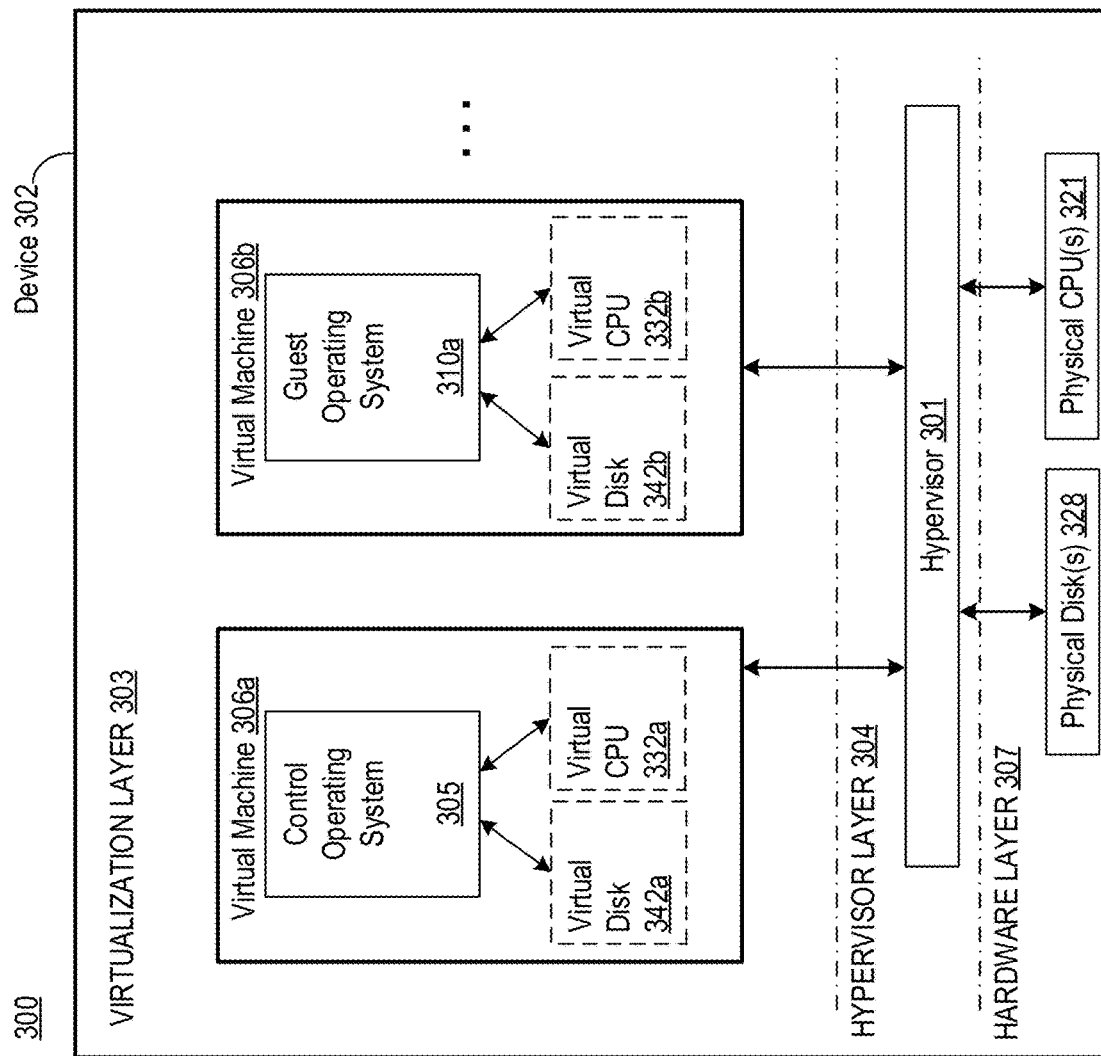
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
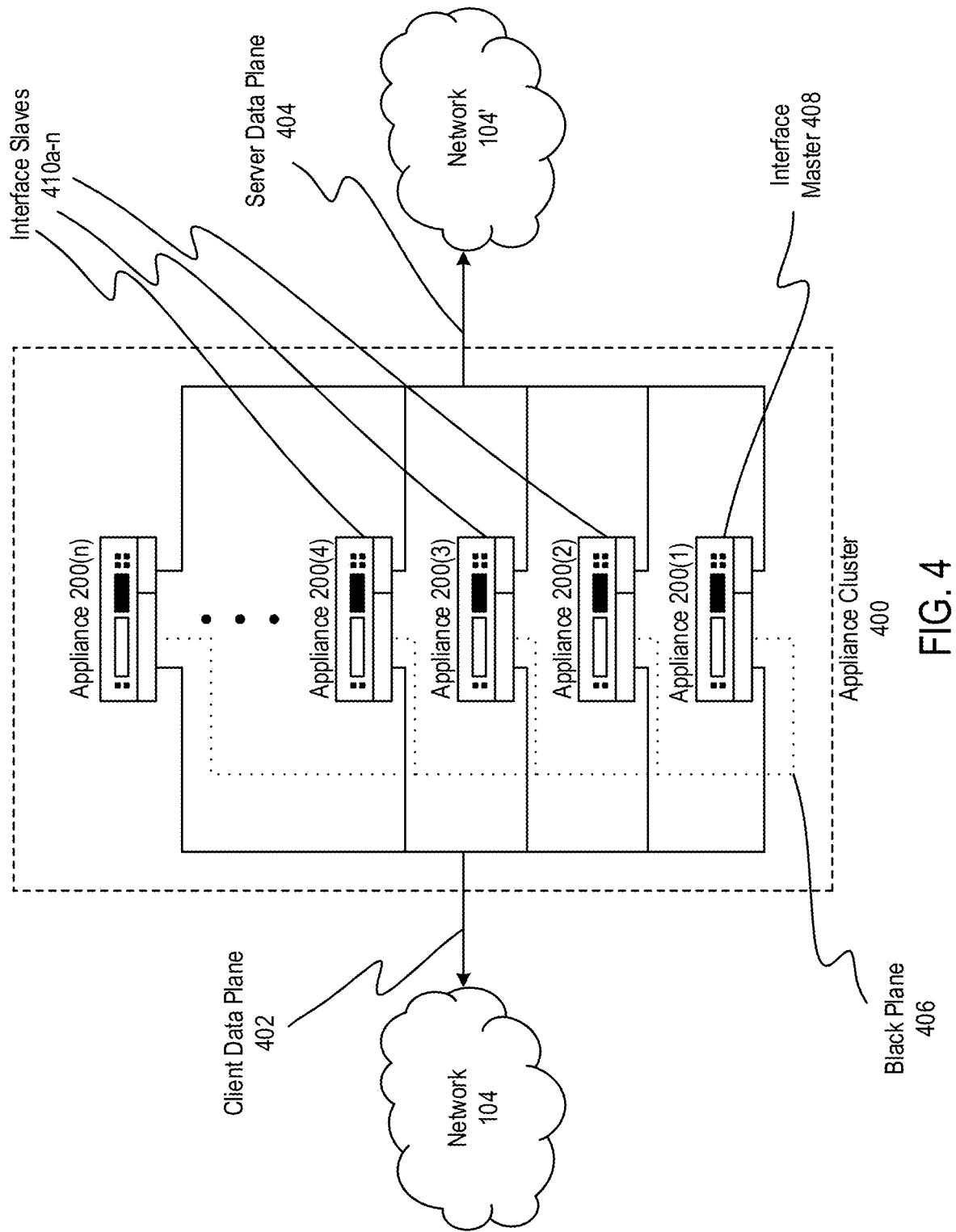
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Figure 5:
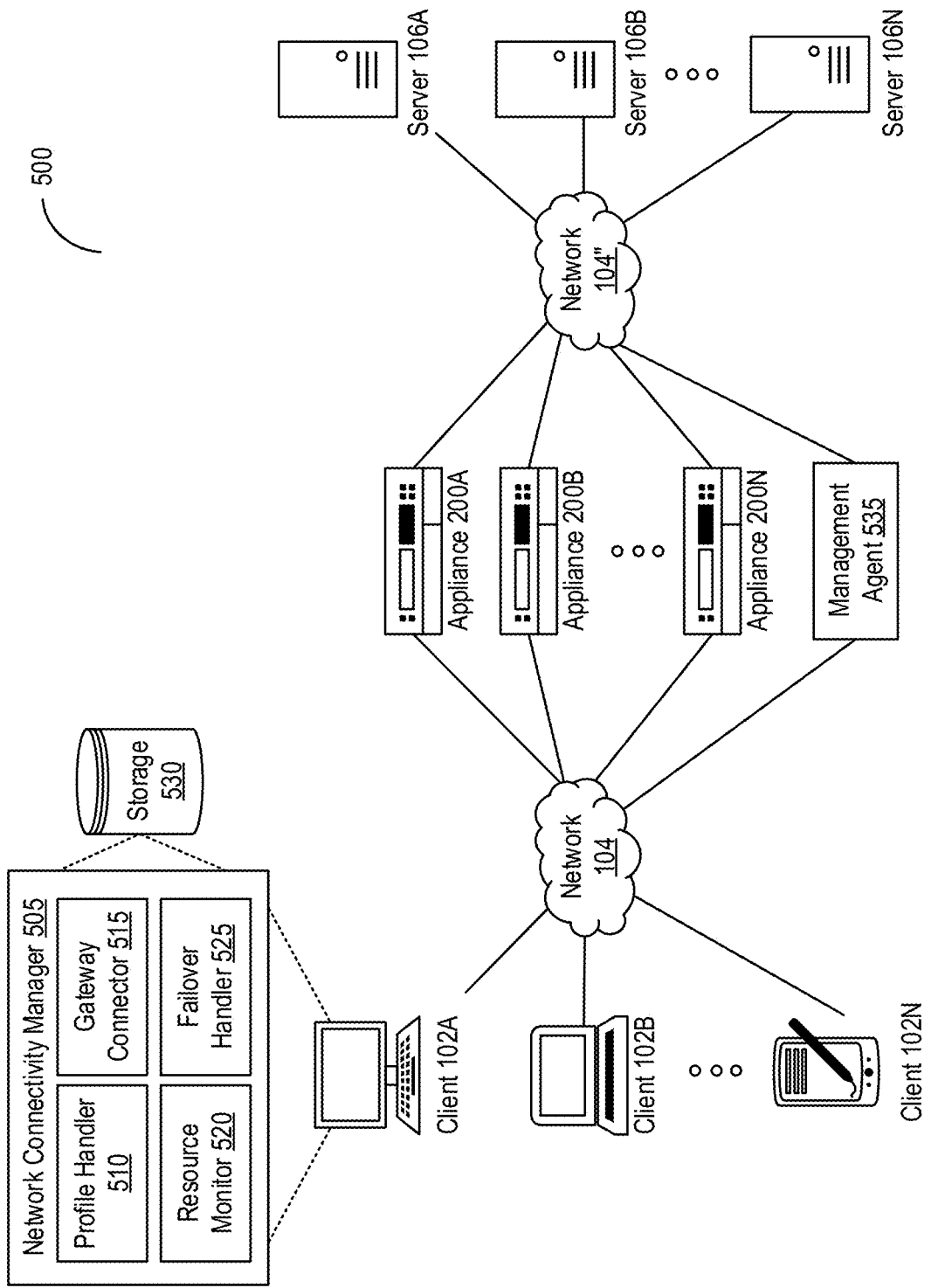
FIG. 5 is a block diagram of an embodiment of a system for selecting gateways for reconnection upon detection of reachability issues on backend resources in accordance with an illustrative embodiment.

E. Systems and Methods for Selecting Gateways for Reconnection Upon Detection of Reachability Issues on Backend Resources Referring now to FIG. 5, depicted is a system 500 for selecting gateways for reconnection upon detection of reachability issues on backend resources. In overview, the system 500 may include one or more clients 102A-N (hereinafter generally referred to as clients 102), one or more servers 106A-N (hereinafter generally referred to as servers 106), one or more appliances 200A-N (hereinafter generally referred to as appliances 200 and generally referred to as gateways, proxies, or intermediary devices) deployed between the clients 102 and the servers 106, and at least one management agent 535, among others. At least one of the clients 102 may execute, have, or include at least one network connectivity manager 505. The network connectivity manager 505 may include at least one profile handler 510, at least one gateway connector 515, at least one resource monitor 520, at least one failover handler 525, and at least one storage 530, among others. The client 102 may be configured or provided with the network connectivity manager 505 by a network administrator of the network 104 or 104'. In some embodiments, the management agent 535 may reside on a device separate from the appliances 200 or may be a part of one or more of the appliances 200.

The systems and methods of the present solution may be implemented in any type and form of device, including clients 102, servers 106, appliances 200, and the management agent 535. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

Figure 6A:
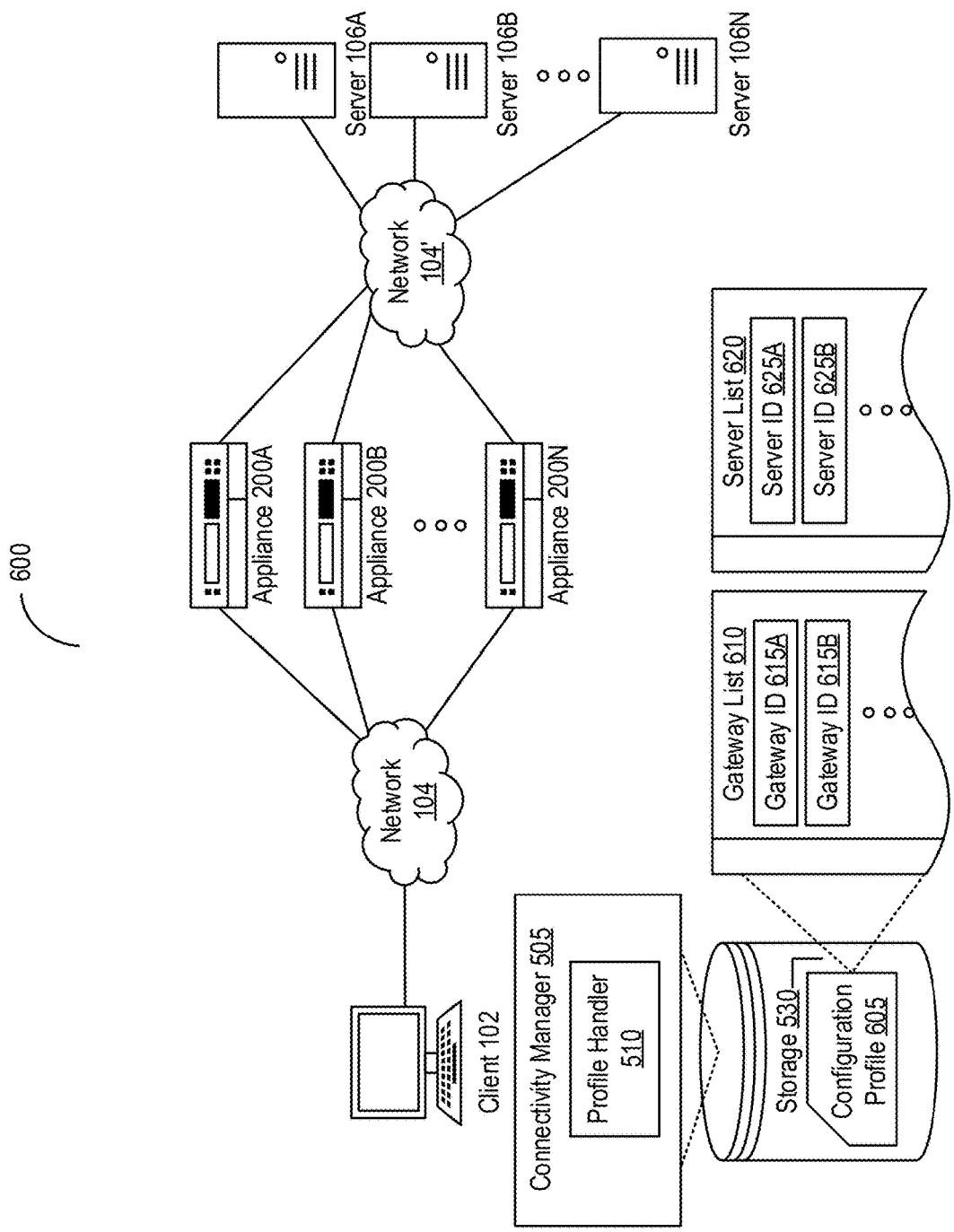
FIG. 6A is a block diagram of an embodiment of a process for handling profiles communications in the system for selecting gateways in accordance with an illustrative embodiment.

Referring now to FIG. 6A, depicted is a block diagram of a process 600 for handling profiles in the system 500 for selecting gateways. The process 600 may correspond to prior to establishment of a connection between the client 102 and one of the appliances 200. Under the process 600, the profile handler 510 executing on the client 102 may retrieve, identify, or otherwise receive at least one configuration profile 605 (generally referred herein as a profile). In some embodiments, the profile handler 510 may receive the configuration profile 605 from a network administrator or another entity associated with the appliances 200 or servers 106. The receipt from the network administrator may be prior to connection with any of the appliances 200 of the network 104 or 104'. In some embodiments, the profile handler 510 may receive the configuration profile 605 upon establish a connection with at least one of the appliances 200. The establishment of the connection will be detailed herein below in conjunction with the gateway connector 515. Upon receipt, the profile handler 510 may parse the configuration profile 605 to extract or identify the contents therein.

The configuration profile 605 may specify, define, or otherwise identify at least one gateway list 610. The gateway list 610 may include or identify a set of gateway identifiers 615A-N (hereinafter generally referred to as gateway identifiers 615). Each gateway identifier 615 may identify, reference, or correspond to a respective appliance 200 via which the client 102 is permitted to connect in accessing one of the servers 106 identified in the server list 620. At least one of the gateway identifiers 615 (e.g., gateway identifier 615A) may correspond to a primary appliance 200 (e.g., appliance 200A) with which the client 102 is to first connect in accessing the server 106. At least one of the gateway identifiers 615 (e.g., the gateway identifier 615B) may correspond to an alternate appliance 200 (e.g., appliance 200B) with which the client 102 can connect when one or more servers 106 are unreachable via the primary appliance 200. In some embodiments, the gateway list 610 may define or specify a sequence for the gateway identifiers 615 corresponding to the appliances 200 to which the client 102 is to connect. The gateway identifier 615 may include, for example, a domain name (e.g., a full qualified domain name (FQDN) in the form of a uniform resource locator (URL)) or a network address (e.g., an Internet Protocol (IP) address or a media access control (MAC) address), among others corresponding to the respective appliance 200.

In addition, the configuration profile 605 may specify, define, or otherwise identify at least one server list 620. Furthermore, the server list 620 of the configuration profile 605 may include or identify one or more server identifiers 625A-N (hereinafter generally referred to as server identifiers 625A-N). Each server identifier 625 may identify, reference, or correspond to a respective server 106 that is to be accessed by the client 102 via one of the appliances 200. The server identifier 625 may include, for example, a domain name (e.g., a full qualified domain name (FQDN) in the form of a uniform resource locator (URL)) or a network address (e.g., an Internet Protocol (IP) address or a media access control (MAC) address), among others corresponding to the respective server 106.

The configuration profile 605 may specify, define, or otherwise identify one or more other specifications for the connection between the client 102 with the servers 106 identified in the server list 620 via one of the appliances 200 identified in the gateway list 610. The specifications may define or identify a condition under which the client 102 is to initiate a failover procedure from the initially connected appliance 200 to an alternate appliance 200. In some embodiments, the configuration profile 605 may specify or identify a minimum number of servers that are to be reachable from the client 102 via each of the appliances 200 identified in the gateway list 610. The minimum number may delineate a value for the number of reachable servers 106 at which to trigger a failover procedure from one appliance 200 to another. In some embodiments, the configuration profile 605 may specify or identify a maximum number of servers that are unreachable from the client 102. The maximum number may delineate a value for the number of reachable servers 106 at which to trigger a failover procedure from one appliance 200 to another. In some embodiments, the configuration profile 605 may specify or identify a maximum number of attempts to reach the servers 106 identified in the server list 620 via each of the appliance 200 identified in the gateway list 610. The number of attempts may specify a value for the number of attempts at which to trigger the failover procedure from one appliance 200 to another.

From parsing the configuration profile 605, the profile handler 510 may extract or identify the gateway list 610. Using the gateway list 610, the profile handler 510 may extract or identify the gateway identifiers 615. The profile handler 510 may further identify the set of appliances 200 corresponding to the gateway identifiers 615 of the gateway list 610. In addition, the profile handler 510 may extract or identify the server list 620 of the configuration profile 605. Using the server list 620, the profile handler 510 may extract or identify the server identifies 625. The profile handler 510 may the set of servers 106 corresponding to the server identifiers 625. In some embodiments, the profile handler 510 may identify the specifications defined by the configuration profile 605, such as the minimum number of servers 106 to be accessed by the client 102 and the maximum number of attempts after which the client 102 is to initiate the failover procedure, among others.

Figure 6B:
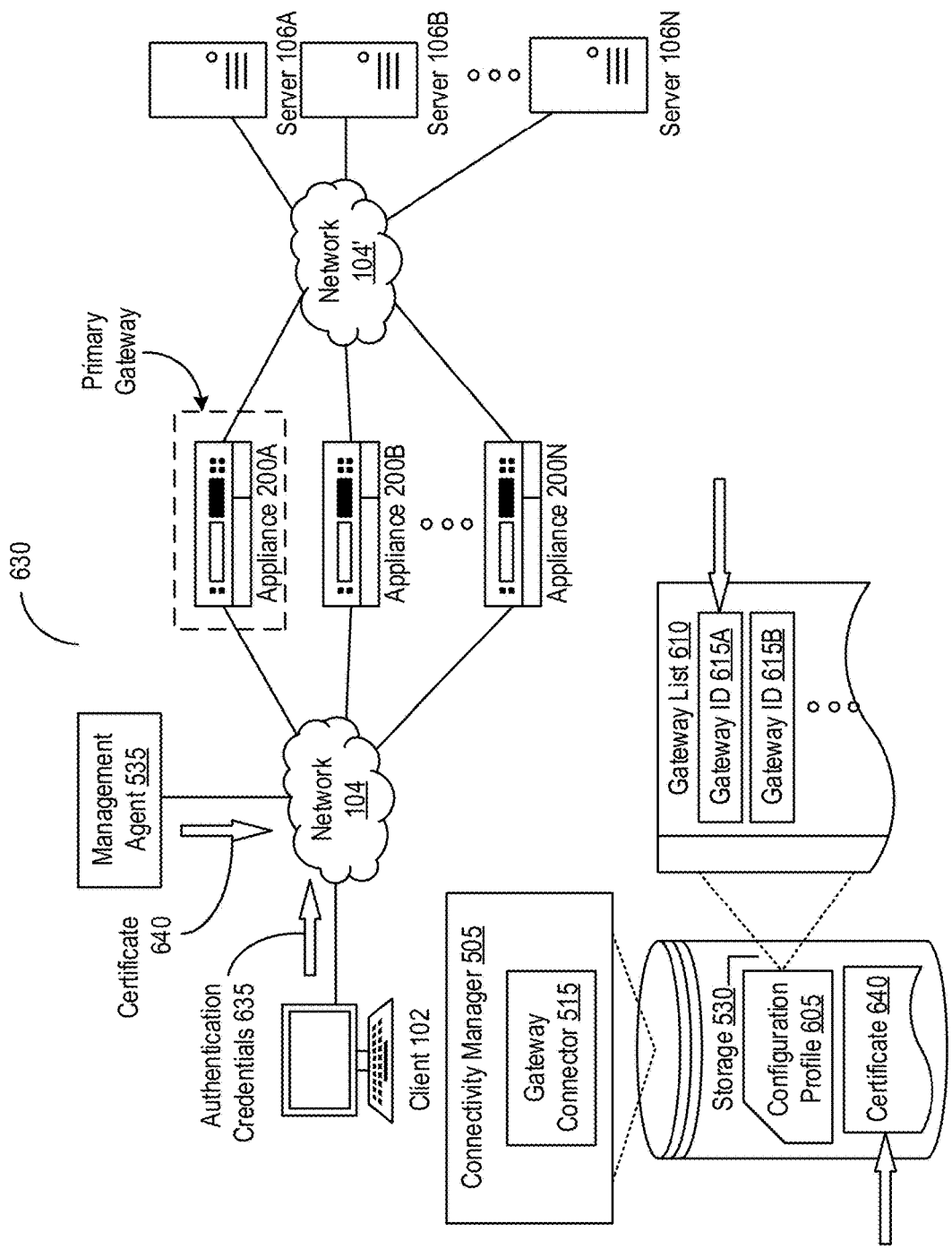
FIG. 6B is a block diagram of an embodiment of a process for initiating communications in the system for selecting gateways in accordance with an illustrative embodiment.

Referring now to FIG. 6B, depicted is a block diagram of a process 630 for initiating communications in the system 500 for selecting gateways. The process 630 may be performed in connection or subsequent to the process 600 with the identification of the configuration profile 605. Under the process 630, the gateway connector 515 executing on the client 102 may determine, select, or otherwise identify a primary appliance 200A (sometimes referred herein as a primary gateway) to which the client 102 is to connect with. The gateway 505 may identify the primary appliance 200A using the gateway list 610 of the configuration profile 605. In some embodiments, the gateway connector 515 may identify the primary appliance 200A corresponding to the gateway identifier 615A defined as the primary gateway by the configuration profile 605. The gateway list 610 of the configuration profile 605 may specify that the client 102 is to connect with the primary appliance 200A corresponding to the gateway identifier 615A, prior to connection with any of the other available appliances 200. In some embodiments, the primary appliance 200A may correspond to the appliance 200 that the client 102 first connects among the set of appliances 200, when the client 102 lacks the configuration profile 605. For example, the primary appliance 200A may correspond to the one that the client 102 is to connect with by default as defined by the connectivity manager 505 when accessing the network 104.

With the identification, the gateway connector 515 may initiate and establish a connection with the primary appliance 200A using the gateway identifier 615A identified from the gateway list 610. The establishment of the connection with appliance 200A may be to set up a secure communications between the client 102 and the primary appliance 200A in accordance with a communications protocol used by the appliances 200 or the network 104. For example, the network 104 and 104' may be a virtual private network (VPN) or a software defined wide area network (SD-WAN) established over a public network such as the internet. Pursuant to the communications protocol, the gateway connector 515 may establish a secure tunnel over the network 104 with the primary appliance 200A, such as a VPN tunnel as a part the VPN network or an IP security association (IPsec) tunnel through the SD-WAN. The gateway connector 515 and the primary appliance 200A may exchange one or more messages in accordance with the communications protocol to establish the secure communications. For instance, the messages between the gateway connector 515 and the server 106 may be in accordance with a handshake specified by the communications protocol.

Prior to or in conjunction with the connection with the primary appliance 200A, the gateway connector 515 may present or provide a prompt for a user of the client 102 to enter authentication credentials 635 to login with the management agent 535. The management agent 535 may handle authentication of the client 102 for establishing connections with any one of the appliances 200. The provision of the prompt may be as part of an authentication procedure with the management agent 535 to access one or more of the appliances 200 including the primary appliance 200A. In some embodiments, the management agent 535 may reside on the primary appliance 200A, and the functionalities described herein may be performed by the primary appliance 200A. In some embodiments, the management agent 535 may be on a device separate from the appliances 200, and may perform the functionalities described herein out-of-band relative to communications between the client 102 and the appliances 200. The authentication credentials 635 may include, for example, an account identifier corresponding to an identity of the user and a passcode such a set of alphanumeric characters to confirm an identity of the user or a biometric marker corresponding to the user, among others. The user of the client 102 may enter or input the authentication credentials 635 using one or more input/output (I/O) devices. Upon entry, the gateway connector 515 may send, transmit, or otherwise provide the authentication credentials 635 to the management agent 535.

With the receipt, the management agent 535 may check the authentication credentials 635 provided by the client 102 against a record of the credentials for the user accessible to the management agent 535. The record of the credentials 635 may be stored and maintained on a database accessible to the management agent 535 and the appliances 200. If the credentials 635 do not match, the management agent 535 may refrain from authentication of the client 102 for establishing the connection with the appliances 200 including the primary appliance 200A. In some embodiments, the management agent 535 may determine that the authentication credential provided by the client 102 is not validated. In some embodiments, the management agent 535 may send a message indicating a failure of authentication to the client 102. Upon receipt of the indication, the gateway connector 515 may provide the prompt to the user to re-enter the authentication credentials 635, and repeat the authentication procedure with the management agent 535.

Conversely, if the credentials 635 match, the management agent 535 may authenticate the client 102 to establish the connection with the primary appliance 200A. In some embodiments, the management agent 535 may also validate the authentication credentials 635 provided by the client 102. With the validation of the authentication credentials 635, the management agent 535 may also issue or generate at least one certificate 640 to authenticate the client 102 for secure communications with the appliances 200 including the primary appliance 200A. In some embodiments, the certificate 640 may be generated by a certificate authority separate from the management agent 535. The certificate 640 may identify or include: at least one identity associated with the client 102 or the user of the client 102; at least one cryptographic key (e.g., a public key) to be used to encrypt communications between the client 102 and the management agent 535; at least one digital signature corresponding to an entity (e.g., the management agent 535 or the certificate authority) issuing the certificate 640, among others. Upon generation, the management agent 535 may also send, transmit, or otherwise provide the certificate 640 to authenticate the client 102.

In some embodiments, the management agent 535 may retrieve or identify at least a portion of the configuration profile 605 for the client 102 using the authentication credentials 635, upon validation. In some embodiments, the client 102 may initially lack one or more portions of the configuration profile 605, such as the gateway list 610 or the server list 620, and may be provided the configuration profile 605 upon validation of the authentication credentials

635. The configuration profile 605 may be maintained and stored on a database accessible to the management agent 535. The management agent 535 may access the database to find, retrieve, or identify the configuration profile 605 using the authentication credentials 635. The configuration profile 605 retrieved by the management agent 535 may also include the gateway list 610 and the server list 615. For example, the gateway list 610 may identify the set of alternate appliance 200 with which the client 102 is permitted to connect in accessing the servers 106 identified in the server list 615. With the identification, the management agent 535 may send, transmit, or otherwise provide the configuration profile 605 in conjunction with the certificate 640 to the client 102.

The gateway connector 515 may in turn retrieve, identify, or otherwise receive the certificate 640 from the management agent 535. Upon receipt, the gateway connector 515 may use the certificate 640 may to establish the connection between the client 102 and the primary appliance 200A. In some embodiments, the gateway connector 515 may store and maintain the certificate 640 on the storage 530. In some embodiments, the gateway connector 515 may identify the primary appliance 200A from the gateway list 610, upon receipt of the certificate 640. To establish the connection, the gateway connector 515 may also provide, send, or otherwise transmit the certificate 640 to the primary appliance 200A.

The primary appliance 200A may in turn retrieve, identify, or otherwise receive the certificate 640 from the client 102. The primary appliance 200A may verify that the client 102 is authenticate by checking the certificate 640 with the management agent 535. Upon receipt and verification of the certificate 640, the primary appliance 200A may complete the establishment of the connection between the primary appliance 200A and the client 102. The certificate 640 may be used for communications between the primary appliance 200A and the client 102. For example, the gateway connector 515 may use the cryptographic key of the certificate 640 to encrypt communications to be sent to the primary appliance 200A and decrypt communications from the primary appliance 200A. In some embodiments, the primary appliance 200A may provide the configuration profile 605 for the client 102. In turn, the gateway connector 515 may retrieve, identify, or receive the configuration profile 605 identified and provided by the primary appliance 200A. Upon receipt, the gateway connector 515 may store and maintain the configuration profile 605 on the storage 630. With the establishment of the connection, the client 102 may attempt to or may be able to access one or more the servers 106 identified by the server list 620 of the configuration profile 605 through the primary appliance 200A.

Figure 6C:
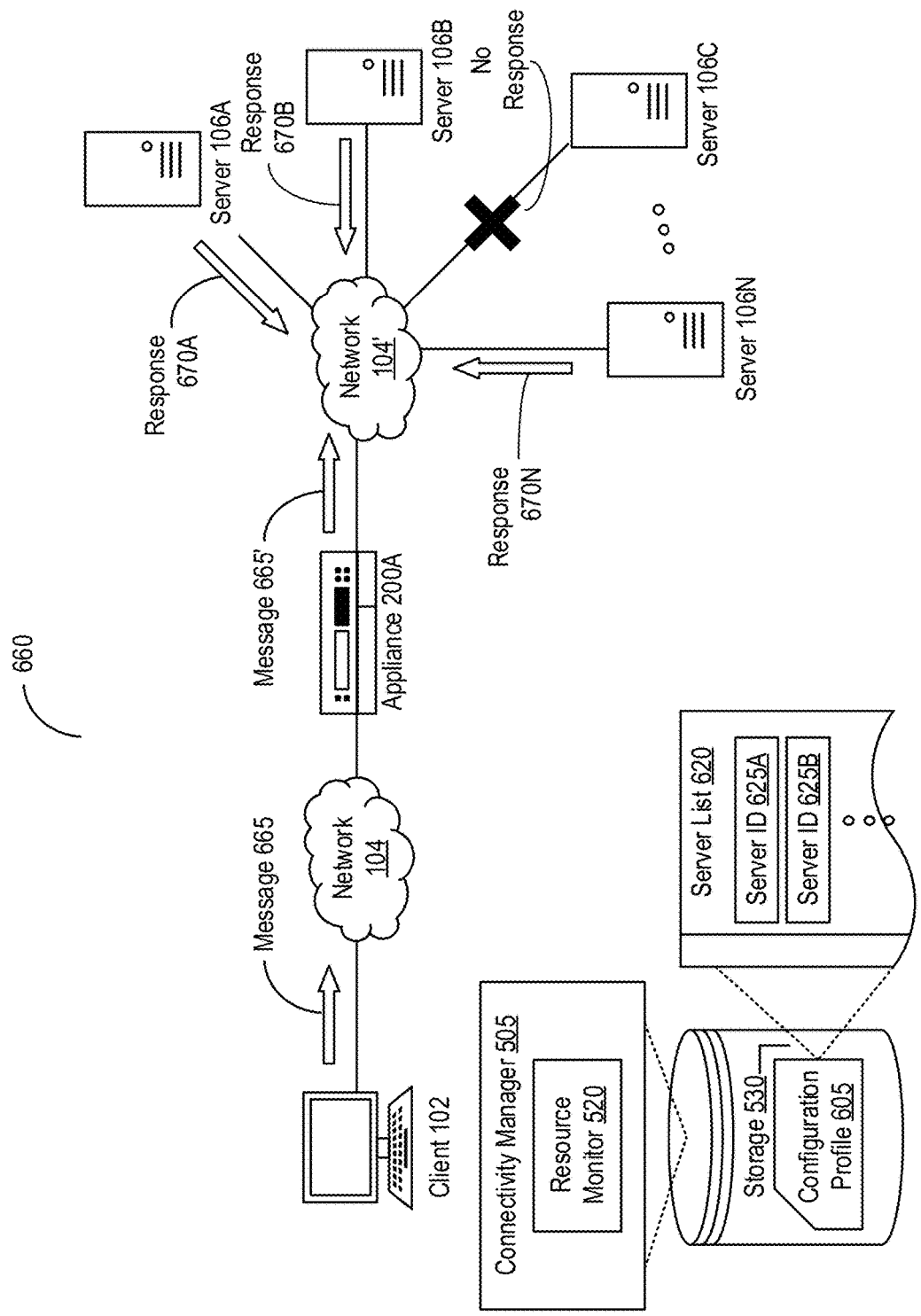
FIG. 6C is a block diagram of an embodiment of a process for monitoring reachability in the system for selecting gateways in accordance with an illustrative embodiment.

Referring now to FIG. 6C, depicted is a block diagram of a process 660 for checking reachability in the system 500 for selecting gateways. The process 660 may be performed subsequent to successful establishment of the connection between the client 102 and the primary appliance 200A. Under the process 660, the resource monitor 520 executing on the client 102 may carry out or perform a reachability check on each server 106 identified in the server list 620 of the configuration profile 605. In performing, the resource monitor 520 may identify the set of servers 106 that the client 102 is to be able to reach via the connection with the primary appliance 200A. From the configuration profile 605, the resource monitor 520 may find or identify the set of servers 106 corresponding to the set of server identifiers 625 specified in the server list 620.

With the identification, the resource monitor 520 may identify, determine, or otherwise detect whether each server 106 is accessible or reachable from the client 102 via the connection with the primary appliance 200A. The connection between the client 102 and the primary appliance 200A may rely on or use the certificate 640 as discussed above. To detect, in some embodiments, the resource monitor 520 may send, provide, or otherwise transmit at least one message 665. The message 665 may be to check the reachability of at least one of the identified server 106 from the client 102 via the connection with the primary appliance 200A. The message 665 may identify one or more of the servers 106 specified by the server list 620 of the configuration profile 605. The primary appliance 200A may in turn retrieve, identify, or receive the message 665 from the client 102 via the network 104 and may forward the message 665 to the identified servers 106 as message 665' via the network 104'.

Upon transmission, the resource monitor 520 may wait or monitor for responses 670A-N (hereinafter generally referred to as responses 670) to the message 665' from each identified server 106. The waiting for the response 670 may be for a set time window (e.g., ranging from a few seconds to minutes) relative to the transmission of the message 665. Each response 670 may identify or indicate acknowledgment of receipt of the message 665' by the corresponding server 106, and may identify the server 106 that generated and sent the response 670. In response to receipt of the message 665', the server 106 may send, return, or transmit the response 670 to the primary appliance 200A. The primary appliance 200A in turn may send or forward the response 670 from each server 106 to the client 102.

Using the receipt of the responses 670, the resource monitor 520 may determine whether the corresponding server 106 is accessible from the client 102 via the connection with the primary appliance 200A. The receipt of the response 670 may correlate with or indicate the reachability of the server 106 (e.g., servers 106A, 106B, and 106N as depicted) from the client 102 via the connection with the primary appliance 200A. When the response 670 is received from the server 106 within the time window, the resource monitor 520 may identify or determine that the corresponding server 106 is reachable from the client 102. In some embodiments, the resource monitor 520 may maintain a counter for the number of servers 106 reachable from the client 102 via the connection. Upon receipt of the response 670, the resource monitor 520 may increment the number of servers 106 kept track by the counter.

In contrast, when the response 670 is not received from the server 106 within the time window, the resource monitor 520 may identify or determine that the corresponding server 106 is unreachable from the client 102 via the connection with the primary appliance 200A. The lack of any response 670 from the server 106 (e.g., the server 106C as depicted) may correlate with or indicate the lack of acknowledgement of the receipt of the message 665'. In some embodiments, the resource monitor 520 may maintain a counter for the number of servers 106 unreachable from the client 102. Upon determining that the server 106 is unreachable, the resource monitor 520 may increment the counter. In addition, the resource monitor 520 may repeat the transmission of the message 665 to the server 106 identified as unreachable, and wait for the response 670 from the server 106. In some embodiments, the resource monitor 520 may maintain a counter for the number of attempts to wait for the response 670 from the corresponding server 106 or across the servers 106 identified in the server list 620. Each time the message 665 is transmitted, the resource monitor 520 may increment the number of attempts kept track by the counter.

In some embodiments, the resource monitor 520 may at least partially share the resource monitoring process with the primary appliance 200A. To that end, the resource monitor 520 may send, transmit, or provide the set of server identifiers 625 corresponding to the set of servers 106 to be accessible from the client 102 to the primary appliance 200A. The primary appliance 200A may retrieve, identify, or receive the server identifiers 625 from the client 102. In some embodiments, the primary appliance 200A may initiate and establish a connection with each server 106 identified in the set of server identifiers 625 over the network 104'. If the establishment of the connection is successful, the primary appliance 200A may determine that the server 106 is reachable from the client 102. The primary appliance 200A may send an indication that the corresponding server 106 is reachable to the client 102. The resource monitor 520 may in turn retrieve, identify, or receive the indication from the primary appliance 200A, and may determine that the identified server 106 is reachable. Otherwise, if the establishment of the connection is unsuccessful, the primary appliance 200A may determine that the server 106 is unreachable from the client 102. The primary appliance 200A may send an indication that the corresponding server 106 is unreachable to the client 102. The resource monitor 520 may in turn retrieve, identify, or receive the indication from the primary appliance 200A, and may determine that the identified server 106 is unreachable.

In some embodiments, the primary appliance 200A may send, provide, or otherwise transmit the at least one message 665' to each identified server 106. The message 665' may be to check the reachability of a corresponding server 106 identified in the set of server identifiers 625. Upon transmission, the primary appliance 200A may wait or monitor for responses 670 to the message 665' from each identified server 106 within a set time period, and may perform the operations of the resource monitor 520 as discussed above. Similar to the resource monitor 520, the primary appliance 200A may use the receipt of responses 570 to determine whether the corresponding server 106 is accessible from the client 102 via the connection with the primary appliance 200A.

When the response 670 is received from the server 106 within the time window, the primary appliance 200A determine that the corresponding server 106 is reachable from the client 102. In some embodiments, the primary appliance 200A may transmit, provide, or otherwise send an indication that the corresponding server 106 is reachable to the client 102. The resource monitor 520 may in turn retrieve, identify, or receive the indication from the primary appliance 200A, and may determine that the identified server 106 is reachable. Conversely, when the response 670 is not received from the server 106 within the time window, the primary appliance 200A may identify or determine that the corresponding server 106 is unreachable from the client 102. In some embodiments, the primary appliance 200A may transmit, provide, or otherwise send an indication that the corresponding server 106 is unreachable to the client 102. The resource monitor 520 may in turn retrieve, identify, or receive the indication from the primary appliance 200A, and may determine that the identified server 106 is unreachable. In some embodiments, the resource monitor 520 may provide the server identifier 625 corresponding to the server 106 identified as unreachable to the primary appliance 200A, and repeat the process of checking the reachability of the server 106.

In some embodiments, the primary appliance 200A may also maintain a counter for the number of reachable servers, a counter for the number of unreachable servers, and a counter for number of attempts as discussed above. With the determinations, the primary appliance 200A may send, transmit, or provide the number of unreachable servers, the number of reachable servers, or the number of attempts, or any combination thereof, to the client 102. The resource monitor 520 may retrieve, identify, or receive the number of unreachable servers, the number of reachable servers, or the number of attempts, transmitted by the primary appliance 200A.

Figure 6D:
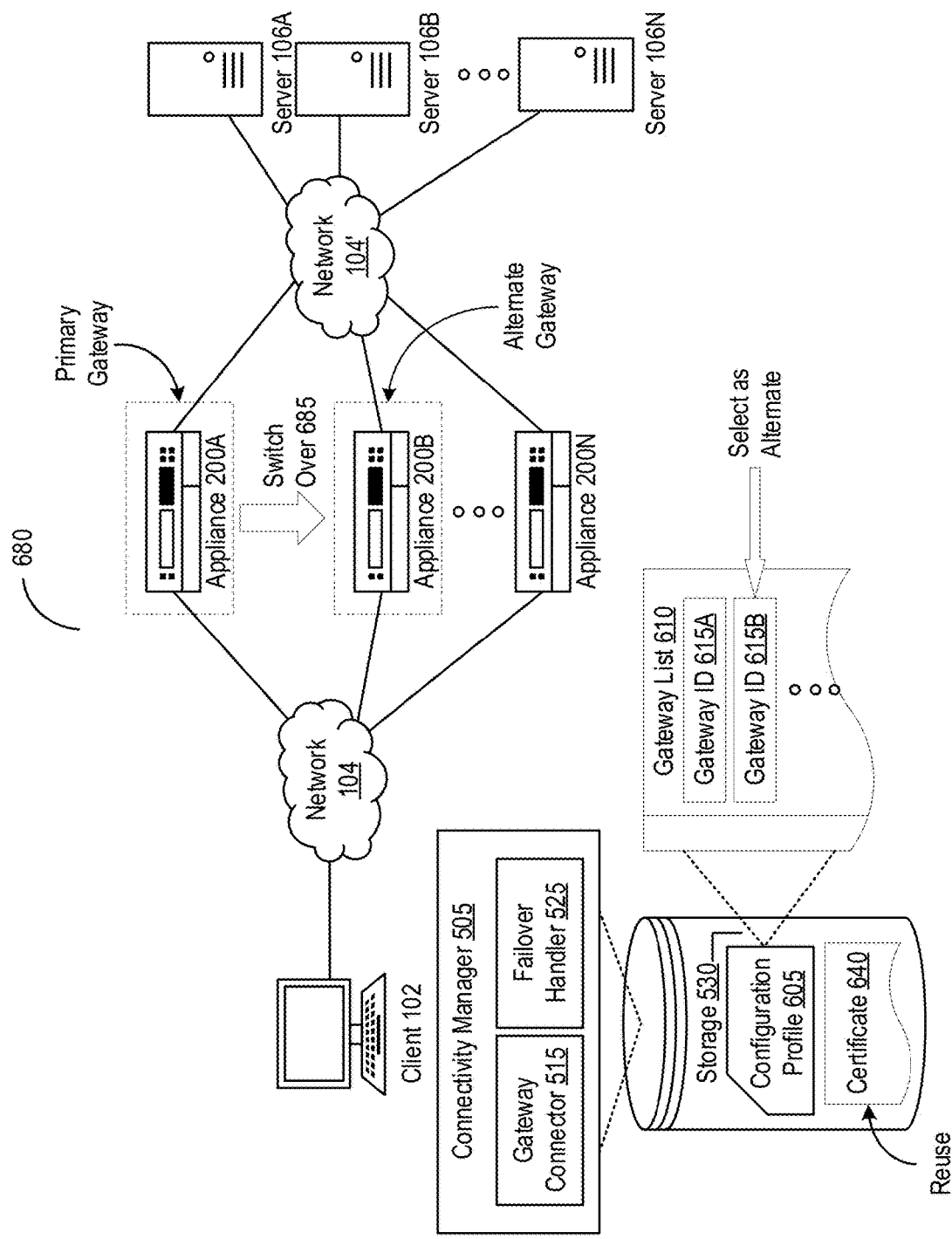
FIG. 6D is a block diagram of an embodiment of a process for switching over in the system for selecting gateways in accordance with an illustrative embodiment.

Referring now to FIG. 6D, depicted is a block diagram of a process 680 for switching over in the system 500 for selecting gateways. The process 680 may be performed upon detection of reachability issues at one or more of the servers 106 identified in the server list 620 of the configuration profile 605. Under the process 680, the failover handler 525 executing on the client 102 may determine whether to perform a switch over 685 from the primary appliance 200A from an alternate appliance 200 (e.g., the appliance 200B). The determination of whether to perform the switch over 685 may be based on the detection that the identified servers 106 are unreachable from the client 102 via the connection with the primary appliance 200A. When all the servers 106 identified in the server list 620 are determined to be reachable from the client 102 via the connection, the failover handler 525 may determine to not perform the switch over 685. The client 102 may continue to access the servers 106 via the connection with the appliance 200A.

Conversely, when at least one server 106 identified in the server list 620 is determined to be unreachable from the client 102, the failover handler 525 may determine to perform the switch over 685. In some embodiments, the failover handler 525 may continue the determination as to whether to perform the switch over 685 based on the conditions specified by the configuration profile 605. The conditions may include, for example, the minimum number of reachable servers, maximum number of unreachable server, and maximum number of attempts, among others. When the number of reachable servers is greater than or equal to the minimum number, the failover handler 525 may determine to not perform the switch over 685, and may invoke the resource monitor 520 to continue with the reachability check process. In contrast, when the number of reachable servers is less than the minimum number, the failover handler 525 may determine to perform the switch over 685.

Continuing on, when the number of unreachable servers is greater than or equal to the maximum number, the failover handler 525 may determine to perform the switch over 685. On the other hand, when the number of unreachable servers is less than the maximum number, the failover handler 525 may determine to not perform the switch over 685, and may invoke the resource monitor 520 to continue with the reachability check process. In addition, when the number of attempts is less than the maximum number specified by the configuration profile 605, the failover handler 525 may determine to not perform the switch over 685. The failover handler 525 may also invoke the resource monitor 520 to continue with the reachability check process. In contrast, when the number of attempts is greater than or equal to the maximum number, the failover handler 525 may determine to perform the switch over 685.

When the switch over 685 is determined to be performed, the failover handler 525 may identify or select an alternate appliance 200B from the set of appliances 200 in accordance with the gateway list 610 of the configuration profile 605. The failover handler 525 may identify the alternate appliance 200B corresponding to the gateway identifier 615B as defined in the gateway list 610. In some embodiments, the failover handler 525 may select the alternate appliance 200B as specified in the sequence of gateways in the gateway list 610 of the configuration list 610. For example, the failover handler 525 may select the third appliance 200A corresponding to the third gateway identifier 615C, after detecting the servers 106 are unreachable from the second appliance 200B referenced by the second gateway identifier 615B.

In some embodiments, the failover handler 525 may determine whether there are more alternate appliances 200B available for selection as identified in the gateway list 610 of the configuration profile 605, when the switch over 685 is determined to be performed. The failover handler 525 may identify all the appliances 200 to which the client 102 connected in attempting to access the server 106. When there are additional appliances 200 available for selection, the failover handler 525 may identify the appliance 200 previously used by the client 102, and select the appliance 200 next identified in the sequence as defined by the gateway list 610. Otherwise, when there are no more appliances 200 available for selection, the failover handler 525 may determine that the servers 106 are unreachable from the client 102 via any of the appliances 200. In some embodiments, the failover handler 525 may provide an indication of the determination that the servers 106 are unreachable. The indication may be presented via a prompt to the user of the client 102. The indication may also be provided to the network administrator.

In some embodiments, the failover handler 525 may select the alternate appliance 200B from the set of appliances 200 available for selection as identified in the gateway list 610 based on a network load at each of the appliances 200. The set of appliances 200 available for selection may correspond to the set of gateway identifiers 615 of the gateway list 610. The failover handler 525 may measure, determine, or identify the network load at each appliance 200 in the set. The network load may include, for example, an amount of network traffic inbound to the appliance 200, network traffic outbound from the appliance 200, an amount of data to be processed at the appliance 200, among others. With the measurements, the failover handler 525 may identify the appliance 200 with the lowest network load. The appliance 200 may be different from the primary appliance 200A (or the previously used appliance 200). The failover handler 525 may select the appliance 200 having the lowest network load as the alternate appliance 200B.

With the selection of the alternate gateway 200B, the gateway connector 515 may carry out, execute, or otherwise perform the switch over 685 from the primary appliance 200A (or previously used appliance 200) to the alternate appliance 200B. The gateway connector 515 may terminate the connection between the client 102 and the primary appliance 200A. The gateway connector 515 may initiate and establish a new connection with the selected alternate appliance 200B. The establishment of the new connection may be in accordance with a communications protocol used by the appliances 200 or the network 104, as described above in conjunction with process 660. In establishing the connection with the alternate appliance 200B, the gateway connector 515 may use the certificate 640 used to authenticate the client 102 with the primary appliance 200A. As discussed above, the certificate 640 may be received from the management agent 535. In some embodiments, the gateway connector 515 may reuse the certificate 640 without providing a prompt for the user of the client 102 to enter or input the authentication credentials 635. In some embodiments, the gateway connector 515 may present or provide a prompt for the user of the client 102 to enter authentication credentials 635 to login with the alternate appliance 200. The processing of the authentication credentials 635 may be performed as discussed above. Upon establishment of the connection with the alternate gateway 200B, the client 102 access one or more the servers 106 identified by the server list 620 of the configuration profile 605 via the alternate appliance 200B. The connectivity manager 505 may also repeat the processes 630 and 660 as discussed above.

In this manner, the configuration profile 605 may be used by the connectivity manager 505 running on the client 102 to check the reachability of the designated servers 106 to be accessed via one of the appliances 200 available to the selection. By having the client 102 perform the check for resource reachability, the complexity associated with probing each and every server 106 from the appliance 200 may be reduced. In addition, the re-use of the certificate 640 from one appliance 200 to another appliance 200 may reduce or eliminate the experience of the user at the client 102 in accessing the resources hosted on the servers 106. The avoidance of repeated entry of the authentication credentials 635 may thus improve the quality of the human-computer interactions (HCIs) between the user at the client 102 and the overall system 500.

Referring now to FIG. 7, depicted is a function band diagram of a method 700 of selecting gateways for reconnection upon detection of reachability issues on backend resources. The functionalities of method 800 may be implemented using, or performed by, the components described in FIGS. 1-6C, such as the client 102. Under the method 700, a client (e.g., the client 102) may connect with at least one gateway (e.g., the appliance 200A) (705). The gateway may return a connection success to the client (710). Upon successful connection, the client may initiate a resource monitoring loop (715). In performing the loop, the client may send a message to check reachability of a resource to a server (e.g., the server 106) (720). If the server is reachable through the gateway, the server may return a reachability response to the client via the appliance (725). Otherwise, if no response is returned, the client may determine that the server is not reachable (730). The client may further identify the next alternate gateway as identified in a configuration profile (e.g., the configuration profile 605) (735). The client may select the next gateway to connect (740), and repeat the functionalities (700)—(730).

Referring now to FIG. 8, depicted is a flow diagram for a method 600 of selecting gateways for reconnection upon detection of reachability issues on backend resources. The functionalities of method 800 may be implemented using, or performed by, the components described in FIGS. 1-6C, such as the client 102. In brief overview, a client may identify a configuration profile (805). The client may connect with a gateway (810). The client may determine whether a backend service is reachable (815). If the backend service is reachable, the client may continue with the gateway connection (820). Conversely, if the backend service is unreachable, the client may determine whether there are additional alternate gateways (825). When there are no more alternate gateways, the client may provide an indication of unreachability (830). Otherwise, when there are additional alternate gateways, the client may identify the next gateway (835). The client may re-use an authentication certificate (840).

In further detail, a client (e.g., the client 102) may identify a configuration profile (e.g., the configuration profile 605) (805). The client may identify a set of backend services (e.g., the servers 106) to be accessed by the client and a set of gateways (e.g., the appliances 200) available for selection to access the servers. The client may identify a first gateway as defined by the configuration profile to connect with.

The client may connect with a gateway (e.g., the primary appliance 200A or another appliance 200) (810). In establishing a connection, the client may prompt a user of the client to enter authentication credentials (e.g., the authentication credentials 635). Upon validation of the credentials, the gateway may issue a certificate (e.g., the certificate 640) to the client. The client may use the certificate in secure communications with the gateway.

The client may determine whether a backend service (e.g., the server 106) is reachable (815). The client may send a message (e.g., the message 365) to check reachability of the backend service toward the gateway. The gateway in turn may forward the message to the backend service. If the message reaches the backend service, the backend service may return a response to the gateway, and the gateway in turn may forward the response to the client. When the response is received, the client may determine that the backend service is reachable. Otherwise, when response is not received in a time window, the client may determine that the backend service is unreachable.

If the backend service is reachable, the client may continue with the gateway connection (820). The client may continue accessing the backend service through the gateway. Conversely, if the backend service is unreachable, the client may determine whether there are additional alternate gateways (e.g., the alternate appliance 200B) (825). The client may identify the alternate gateway from the configuration profile.

When there are no more alternate gateways, the client may provide an indication of unreachability (830). The client may present a prompt that the backend service is unreachable. Otherwise, when there are additional alternate gateways, the client may identify the next gateway (835). The client may select the alternate gateway as defined in the configuration profile, and initiate a connection with the selected gateway. The client may re-use the authentication certificate (e.g., the certificate 640) (840). In establishing the connection, the client may reuse the certificate used with the previously connected gateway.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method of selecting a device via which a client is to connect to a server, comprising:
    identifying, by a client, a server and a plurality of devices intermediary to the client and the server via one of which the client is authenticated to connect to access the server using a certificate;
    detecting that the server is unreachable from the client authenticated to use a first connection via a first device of the plurality of devices using the certificate;
    selecting, by the device responsive to detecting that the server is unreachable, a second device of the plurality of devices via which the client is to access the server; and
    authenticating, by the client using the certificate used to authenticate with the first device, the client to establish a second connection with the second device to access the server.

2. The method of claim 1, further comprising receiving, by the client, for establishing the first connection with the first device, the certificate to authenticate the client to connect with a network for secure communications.

3. The method of claim 1, wherein identifying the server and the plurality of devices further comprises receiving a profile associated with the certificate for the client, the profile identifying a plurality of servers which the client is to access via the plurality of devices.

4. The method of claim 1, wherein detecting that the server is unreachable further comprises monitoring for at least one response from the server to a message transmitted by at least one of the client or the first device.

5. The method of claim 1, wherein detecting that the server is unreachable further comprises receiving, from the first device, an indication that the first device is unable to connect with the server.

6. The method of claim 1, wherein selecting the second device further comprises selecting the second device from the plurality of device in accordance with a profile, the profile identifying a sequence for selection of the plurality of devices.

7. The method of claim 1, wherein selecting the second device further comprises selecting the second device from the plurality of devices based at least on a network load of at least one of the plurality of devices.

8. The method of claim 1, wherein establishing the second connection further comprises re-using the certificate used to authenticate the client in the first connection to authenticate the client for the second connection, without providing a prompt to a user of the client to enter authentication credentials.

9. The method of claim 1, wherein establishing the second connection further comprises providing a prompt to a user of the client to enter authentication credentials for establishing the second connection.

10. The method of claim 1, further comprising:
determining, by the client, that the server is unreachable from the client via none of the plurality of devices; and
providing, by the client, an indication that the server is unreachable via none of the plurality of devices.

11. A system for selecting a device via which a client is to connect to a server, comprising:
a client having one or more processors coupled with memory, configured to:
identify a server and a plurality of devices intermediary to the client and the server via one of which the client is authenticated to connect to access the server using a certificate;
detect that the server is unreachable from the client authenticated to use a first connection via a first device of the plurality of devices using the certificate;
select, responsive to detecting that the server is unreachable, a second device of the plurality of devices via which the client is to access the server; and
authenticate, using the certificate used to authenticate with the first device, the client to establish a second connection with the second device to access the server.

12. The system of claim 11, wherein the client is further configured to receive a profile associated with the certificate for the client, the profile identifying a plurality of servers which the client is to access via the plurality of devices.

13. The system of claim 11, wherein the client is further configured to select the second device from the plurality of device in accordance with a profile, the profile identifying a sequence for selection of the plurality of devices.

14. The system of claim 11, wherein the client is further configured to select the second device from the plurality of devices based at least on a network load of at least one of the plurality of devices.

15. The system of claim 11, wherein the client is further configured to re-use the certificate used to authenticate the client in the first connection to authenticate the client for the second connection, without providing a prompt to a user of the client to enter authentication credentials.

16. The system of claim 11, wherein the client is further configured to provide a prompt to a user of the client to enter authentication credentials for establishing the second connection.

17. The system of claim 11, wherein the client is further configured to:
determine that the server is unreachable from the client via none of the plurality of devices; and
provide an indication that the server is unreachable via none of the plurality of devices.

18. A non-transitory computer readable medium storing program instructions for causing one or more processors to:
identify a server and a plurality of devices intermediary to the client and the server via one of which the client is authenticated to connect to access the server using a certificate;
detect that the server is unreachable from the client authenticated to use a first connection via a first device of the plurality of devices using the certificate;
select, responsive to detecting that the server is unreachable, a second device of the plurality of devices via which the client is to access the server; and
authenticate, using the certificate used to authenticate with the first device, the client to establish a second connection with the second device to access the server.

19. The non-transitory computer readable medium of claim 18, wherein the program instructions further cause the one or more processors to receive a profile associated with the certificate for the client, the profile identifying a plurality of servers which the client is to access via the plurality of devices.

20. The non-transitory computer readable medium of claim 18, wherein the program instructions further cause the one or more processors to re-use the certificate used to authenticate the client in the first connection to authenticate the client for the second connection, without providing a prompt to a user of the client to enter authentication credentials.

* * * * *